United States Patent
Brice (10) Patent No.: US 9,845,733 B2
(45) Date of Patent: Dec. 19, 2017

(54) FIRE SEAL FOR USE WITH A GAS TURBINE ENGINE

(71) Applicant: ROHR, INC., Chula Vista, CA (US)

(72) Inventor: David C. Brice, Bonita, CA (US)

(73) Assignee: ROHR, INC., Chulta Vista, CA (US)

( * ) Notice: Subject to any disclaimer, the term of this patent is extended or adjusted under 35 U.S.C. 154(b) by 9 days.

(21) Appl. No.: 14/875,833

(22) Filed: Oct. 6, 2015

(65) Prior Publication Data

US 2017/0096940 A1    Apr. 6, 2017

(51) Int. Cl.
| F02F 11/00 | (2006.01) |
| F02C 7/25 | (2006.01) |
| F01D 11/00 | (2006.01) |
| F16J 15/06 | (2006.01) |
| F16J 15/08 | (2006.01) |
| F02K 1/80 | (2006.01) |
| F02C 7/28 | (2006.01) |

(52) U.S. Cl.
CPC .............. *F02C 7/25* (2013.01); *F01D 11/005* (2013.01); *F02C 7/28* (2013.01); *F02K 1/805* (2013.01); *F16J 15/065* (2013.01); *F16J 15/0818* (2013.01); *F16J 15/0887* (2013.01); *F05D 2220/32* (2013.01); *F05D 2240/55* (2013.01); *F05D 2250/28* (2013.01); *F05D 2300/6012* (2013.01)

(58) Field of Classification Search
CPC ... F02C 7/25; F02C 7/24; F01D 11/005; F16J 15/0818; F05D 2220/32; F05D 2240/55; F05D 2250/28; F02K 1/80; F02K 1/805; F02K 1/82; F02K 1/822

USPC .............. 277/597, 590, 591, 594, 595, 598; 428/131, 137–140, 195.1
See application file for complete search history.

(56) References Cited

U.S. PATENT DOCUMENTS

| 2,986,878 A | 6/1961 | Townsend | |
| 4,961,588 A * | 10/1990 | Brienza | F16J 15/3204 277/545 |
| 5,524,846 A | 6/1996 | Shine et al. | |
| 5,560,198 A * | 10/1996 | Brewer | F02K 1/805 277/628 |

(Continued)

OTHER PUBLICATIONS

Aperture definition, accessed Mar. 15, 2016 via http://www.merriam-webster.com/dictionary/aperture.*

(Continued)

*Primary Examiner* — Nathan Cumar
(74) *Attorney, Agent, or Firm* — Cantor Colburn LLP (57) ABSTRACT

A fire seal for use with a gas turbine engine is provided. The fire seal includes a body comprising a first metallic sheet and a second metallic sheet adjacent thereto, each sheet having a plurality of segmented fingers, the segmented fingers of the first metallic sheet and the second metallic sheet overlapped such that the space between fingers on one sheet does not overlap the space between the fingers on the other sheet, at least one finger of the first sheet having at least one first flow aperture therein and at least one finger of the second sheet having at least one second flow aperture, the flow aperture of one sheet overlapping the flow aperture of the other sheet. A mesh material is configured to cover the at least one flow aperture of the two sheets, wherein the mesh material is configured to allow the passage of air therethrough.

20 Claims, 5 Drawing Sheets

(56) References Cited

U.S. PATENT DOCUMENTS

| | | | |
|---|---|---|---|
| 7,367,567 B2* | 5/2008 | Farah | F01D 11/003 277/650 |
| 7,735,833 B2* | 6/2010 | Braun | F01D 11/003 277/301 |
| 8,657,563 B2* | 2/2014 | Hayton | F01D 25/26 415/108 |

OTHER PUBLICATIONS

European Search Report, European Application No. 16192673.8, dated Feb. 23, 2017, European Patent Office; European Search Report 8 pages.

* cited by examiner

FIRE SEAL FOR USE WITH A GAS TURBINE ENGINE

BACKGROUND

The subject matter disclosed herein generally relates to seals used in conjunction with gas turbine engines and, more particularly, to fire seals such as turkey feather seals.

Regulatory requirements for modern aircraft require the containment of a fire within a power plant installation. For instance, if a fire is present in the engine compartment surrounding the gas turbine engine, the structures defining the engine compartment must meet certain standards related to flame resistance and fire containment. In order to meet requirements relating to fire containment, fire seals are typically used between separate adjacent components defining the engine compartment to seal between them and prevent the spread of fire. The fire seals resist the flames and the environment of the fire, and will contain the fire by not allowing the flames to pass through.

One known fire seal arrangement is called a "turkey feather" fire seal. The turkey feather seal consists of two adjacent pieces of thin metal, usually having a degree of flexibility, with segmented fingers that overlap one another. The segmented fingers help allow the turkey feather fire seal to compress against a sealing surface. The segmented fingers also help the seal to bend in multiple planes in order to fit it into a location with complex geometry. Owing to these advantages, a turkey feather seal is often used between thrust reverser modules that are supported on an aircraft propulsion system and hinge to an open position. A turkey feather seal mounted to the thrust reverser module will contact and compress against a complexly shaped surface on the engine or other structure when the module is hinged closed, and form an effective fire seal. The turkey feather seal provides a solid barrier so that flame cannot pass to downstream locations.

While the traditional turkey feature seal effectively prevents the passage of flames and spread of fire, it also blocks airflow between the two components it is sealing between. Air flow in an engine compartment is used for cooling purposes. Without air flow through a seal, the air in its vicinity may not be exchanged as frequently as desired and may become very hot. High temperatures within an engine compartment can degrade components and structures. High temperatures might even degrade a turkey feather seal and anneal it to an extent that it loses its spring and seals less effectively.

SUMMARY

According to one embodiment, a fire seal for use with a gas turbine engine is provided. The fire seal includes a body comprising a first metallic sheet and a second metallic sheet adjacent thereto, each sheet having a plurality of segmented fingers, the segmented fingers of the first metallic sheet and the second metallic sheet overlapped such that the space between fingers on one sheet does not overlap the space between the fingers on the other sheet, at least one finger of the first sheet having at least one first flow aperture therein and at least one finger of the second sheet having at least one second flow aperture, the flow aperture of one sheet overlapping the flow aperture of the other sheet. A mesh material is configured to cover the at least one flow aperture of the two sheets, wherein the mesh material is configured to allow the passage of air therethrough.

According to another embodiment, a fire seal is provided. The fire seal includes a frame formed of a flexible metal, the frame configured to attach to a first surface and a mesh material is supported by the frame. When the frame is pushed against a second surface, the mesh material is configured to allow the passage of air therethrough and provide a seal between the first surface and the second surface.

Technical effects of embodiments of the present disclosure include a a fire seal that is configured to enable airflow therethrough while preventing flames from passing through the fire seal. Further technical effects include a fire seal such as a turkey feather seal that is configured to enable airflow therethrough while preventing flames from passing through the turkey feather seal.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Figure 1:
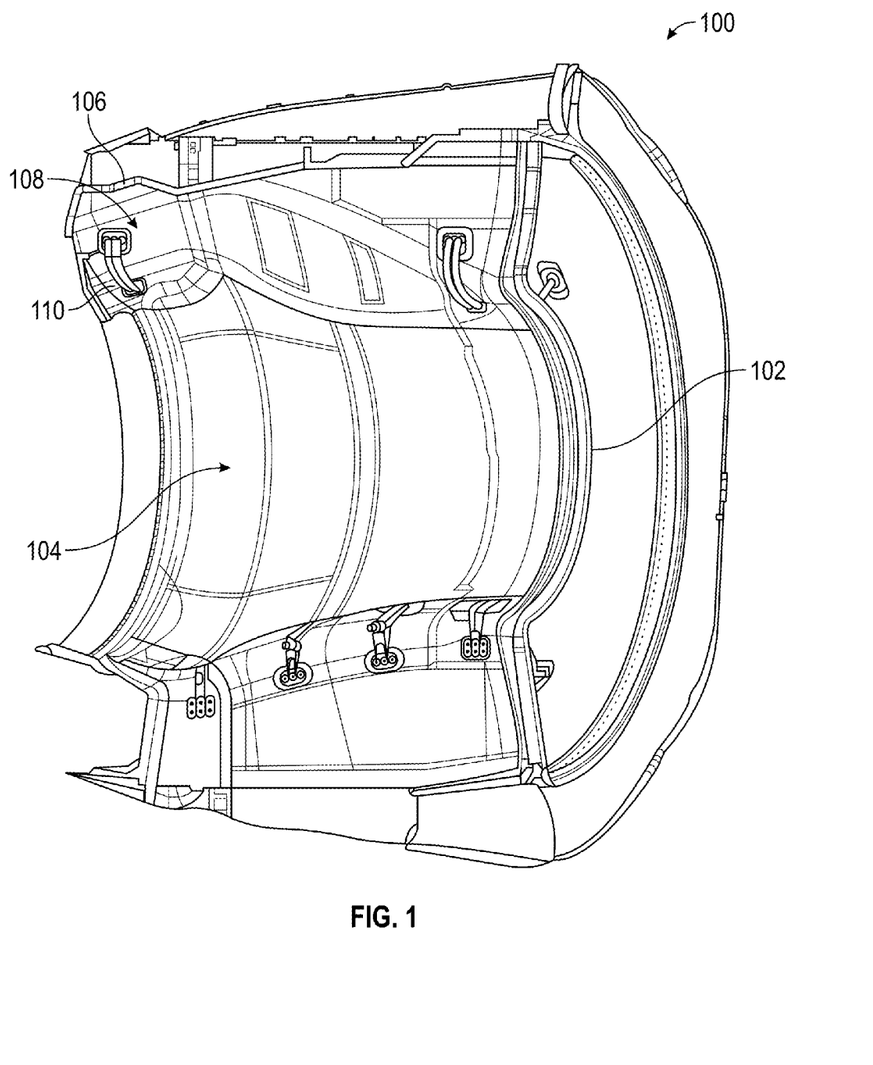
FIG. 1 is a schematic illustration of a portion of a gas turbine engine that may employ embodiments of the present disclosure.

Shown in FIG. 1, duct 100 of a gas turbine engine is shown. The duct 100 may be a c-duct pylon mounted thrust reverser of a gas turbine engine. The duct 100 may have an inner fixed structure 102 and define an area 104 therein. The area 104 may be, in some embodiments, Zone3 of a gas turbine engine. In some embodiments, the area 104 is a space between an engine and a thrust reverser. Various edges of the duct 100 may include elastomeric fire seals 106. However, certain locations of the duct 100 may reach high temperatures during operation of the gas turbine engine, and thus may not be able to employ an elastomeric fire seal, such as at hot zone 108, and particularly in an airflow or axial direction of the gas turbine engine. Thus, for example, in an upper aft section, downstream of the hot zone 108 (with a forward direction being to the right in FIG. 1) a turkey feather seal 110 may be positioned to provide a seal.

Figures 2A, 2B:
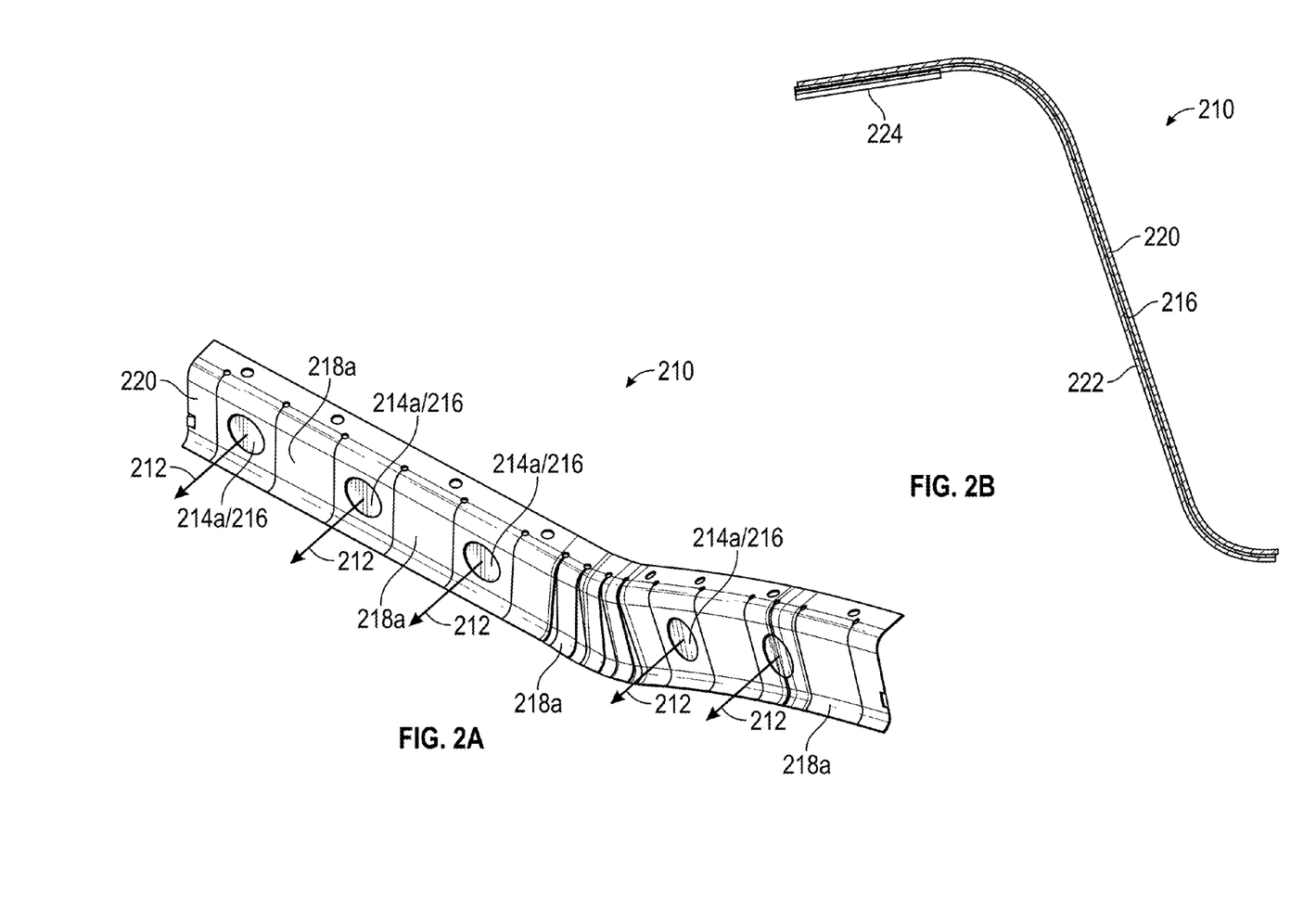
FIG. 2A is a perspective schematic illustration of a fire seal in accordance with an embodiment of the present disclosure.
FIG. 2B is a side sectional schematic illustration of the fire seal of FIG. 2A.

The turkey feather seal 110 may basically be formed from two thin sheets of metal (aluminum, titanium, stainless steel are among possible materials which could be utilized) with a degree of flexibility that include segmented overlapping "fingers" (see, e.g., FIG. 2A). The two sheets of metal are placed adjacent to one another in such a position where the space or boundary between adjacent fingers on one sheet does not line up with the space or boundary between adjacent fingers on the other sheet. The segmented fingers allow for bending and shaping, as one of the fingers can bend in multiple planes independently of the others. As described herein, various non-limiting example configurations of fire seals in accordance with embodiments of the disclosure will be described. Those of skill in the art will appreciate that the first seals described herein may be fixed to one of the thrust reverser or the engine, and compressed or retained therebetween such that the fire seal prevents flames from moving from one section of an engine to another.

Figure 2C:
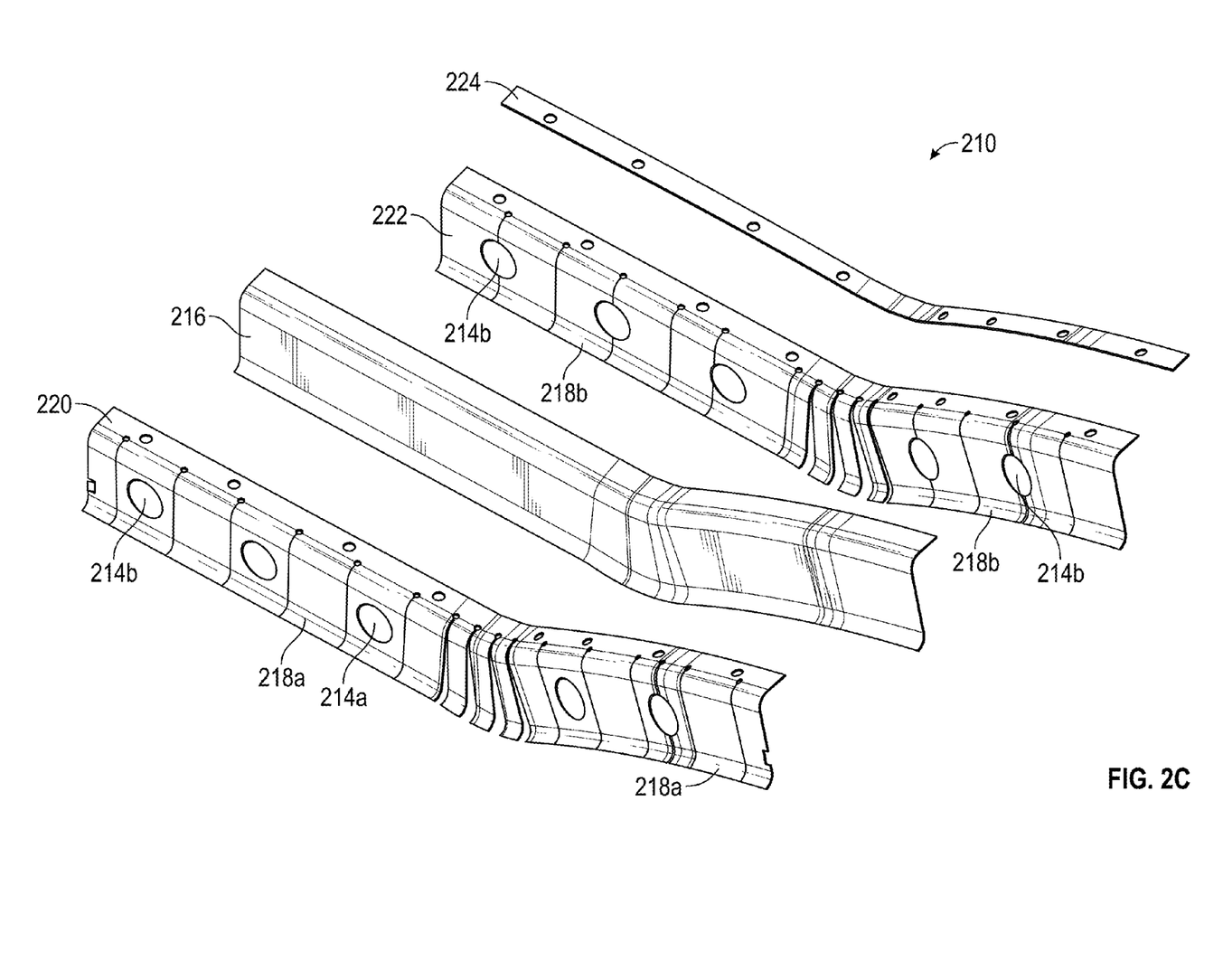
FIG. 2C is an exploded schematic illustration of the fire seal of FIG. 2A.

Turning now to FIGS. 2A-2C, various views of a fire seal in accordance with an embodiment of the present disclosure is shown. FIG. 2A shows a perspective schematic illustration of a fire seal 210. FIG. 2B shows a side sectional schematic view of the fire seal 210 of FIG. 2A. FIG. 2C shows an exploded view of the fire seal 210 of FIG. 2A. As will be appreciated by those of skill in the art, the fire seal 210 is configured as a turkey feather seal, as described below.

With reference to FIG. 2A, the fire seal 210 forms a seal, when installed, that enables airflow therethrough, as indicated by arrows 212, but prevents flames, or particles, from passing through the fire seal 210. To enable the airflow through the fire seal 210, the fire seal 210 includes one or more flow apertures 214a. The flow apertures 214a are configured such that a hole or other opening is present in the structure of the fire seal 210. Further, each flow aperture 214a is covered with a mesh material 216 that is selected of a material and/or mesh configuration that enables airflow therethrough, but prevents flame from pass through the mesh material 216. In some configurations the mesh material 216 may be a metallic screen or metallic gauze.

As shown, the fire seal 210 includes a plurality of fingers 218 on a body thereof. With reference to FIG. 2B, the fire seal 210 includes a first body or sheet 220 and a second body or sheet 222 with the mesh material 216 configured and retained between the first sheet 220 and the second sheet 222. Each of the first sheet 220 and the second sheet 222 may have fingers 218a, 218b, respectively, and the fingers 218a, 218b may misalign when the first sheet 220 is aligned with the second sheet 222 such that a seal is formed, i.e., a continuous surface is formed by the fingers 218a, 218b of the first sheet 220 and the second sheet 222, as will be appreciated by those of skill in the art. However, as will be apparent, due to the flow apertures 214a, the surface of the fire seal 210 is not completely continuous. Also shown in FIG. 2B, a retainer 224 is provided to support the first sheet 220, the second sheet 222, and in some embodiments, the mesh material 216. The retainer 224 may also provide structural support for when the fire seal 210 is attached to a portion of the engine, as described above.

With reference to FIG. 2C, an exploded view of the fire seal 210 of FIG. 2A is shown. The first sheet 220 may include a plurality of fingers 218a and one or more flow apertures 214a therein. The second sheet 222 may include a plurality of fingers 218b and one or more flow apertures 214b therein. When the first sheet 220 is attached to the second sheet 222, the flow apertures 214a, 214b of both bodies 220, 222 are aligned to allow fluid flow therethrough, and the fingers 218a, 218b are misaligned to prevent fluid flow. As shown, the mesh material 216 has the same shape, geometry, and configuration of the first and second bodies 220, 222. As such, when the first sheet 220 is connected to the second sheet 222, the mesh material 216 may cover each of the flow apertures 214a, 214b. The retainer 224 may be provided to supply structural support to the fire seal 210.

Figure 3:
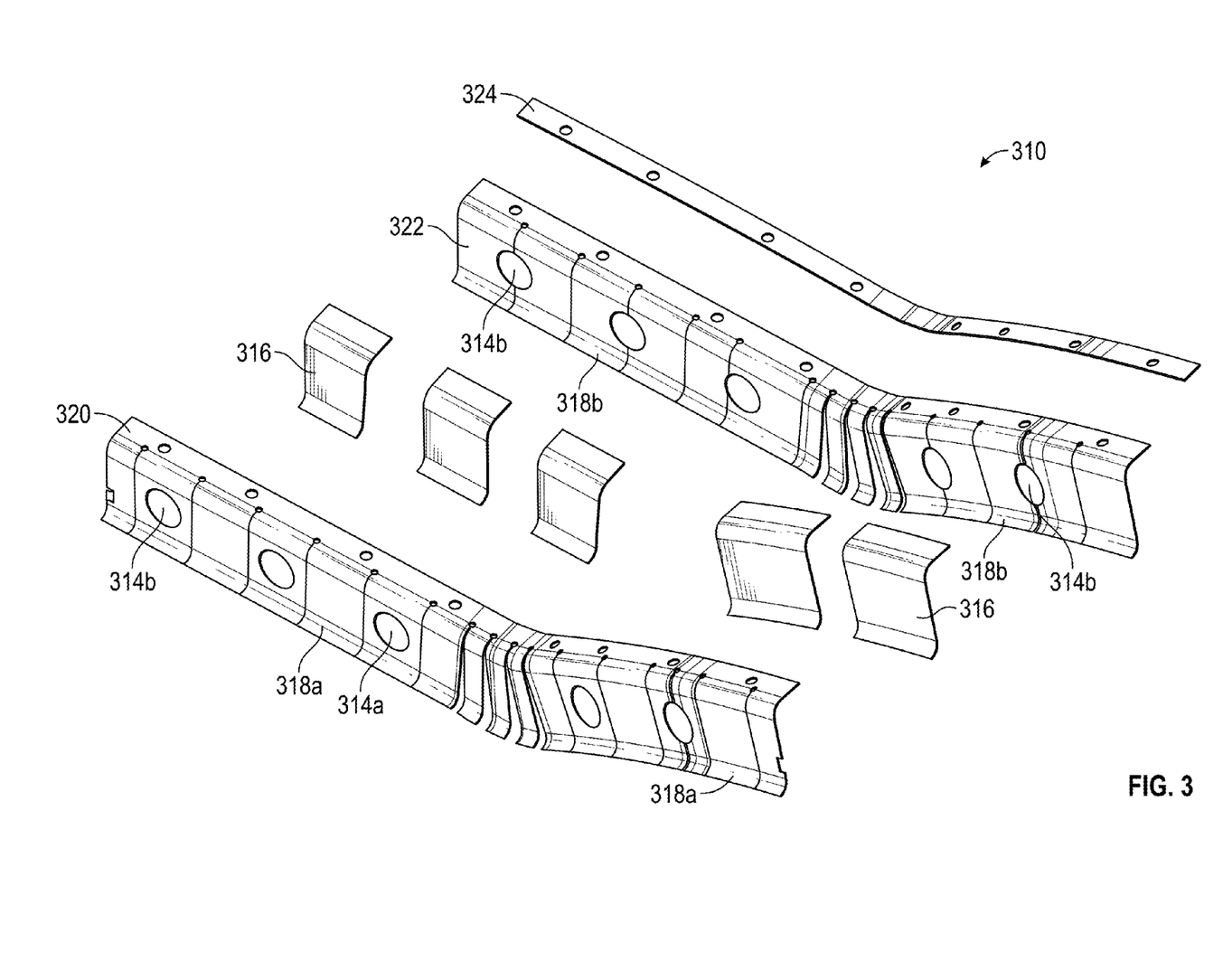
FIG. 3 is an exploded schematic illustration of an alternative embodiment of a fire seal in accordance with the present disclosure.

Turning now to FIG. 3, an alternative configuration of a fire seal in accordance with an embodiment of the present disclosure is shown. Fire seal 310 operates similar to the fire seals described above, and has a similar configuration as fire seal 210 of FIGS. 2A-2C.

In FIG. 3, an exploded view of the fire seal 310 is shown. The first body 320 may include a plurality of fingers 318a and one or more flow apertures 314a therein. The second body 322 may include a plurality of fingers 318b and one or more flow apertures 314b therein. When the first body 320 is attached to the second body 322, the flow apertures 314a, 314b of both bodies 320, 322 are aligned to allow fluid flow therethrough, and the fingers 318a, 318b are misaligned to prevent fluid flow.

The primary difference between the embodiment of FIG. 3 and the embodiment of FIGS. 2A-2C is the configuration of the mesh material 316. As shown, the mesh material 316 is formed from a plurality of segments of mesh material, with each segment having the same shape, geometry, and configuration of a corresponding section of the first and second bodies 320, 322. As such, when the first body 320 is connected to the second body 322, the segments of the mesh material 316 may cover each of the flow apertures 314a, 314b. The retainer 324 may be provided to supply structural support to the fire seal 310. Although shown with a specific configuration of the segments of the mesh material 316, those of skill in the art will appreciate that each segment of the mesh material may take any shape or geometry such that it covers the flow apertures of the first and second bodies. For example, in some embodiments, the segments of mesh material may be circular screens or gauzes that have a larger diameter than the diameter of the flow apertures.

In some non-limiting embodiments, in configurations similar to that shown in FIGS. 2A-2C and FIG. 3, one of the bodies or sheets may be eliminated, such that only one body or sheet having flow apertures therein and a mesh material portion configured over or within each of the flow apertures thereof.

Figure 4A:
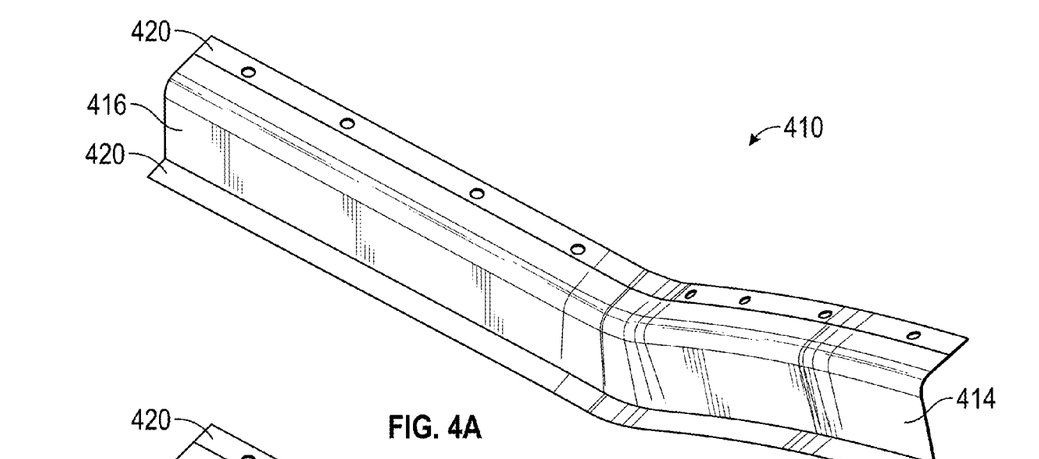
FIG. 4A is a perspective schematic illustration of an alternative embodiment of a fire seal in accordance with the present disclosure.
Figure 4B:
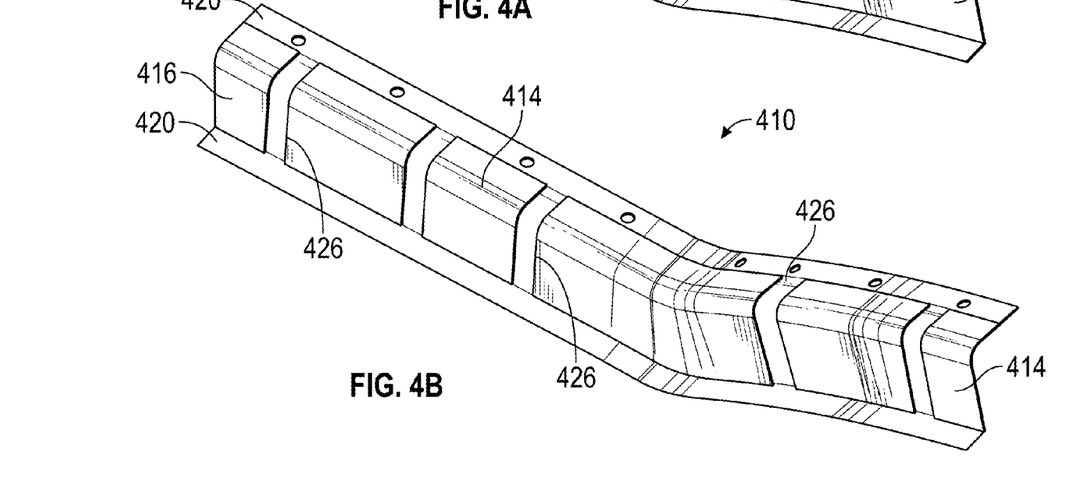
FIG. 4B is a perspective schematic illustration of an alternative embodiment of a fire seal in accordance with the present disclosure

Turning now to FIGS. 4A and 4B, alternative configurations of a fire seal in accordance with an embodiment of the present disclosure is shown. In the embodiment of FIG. 4A, the fire seal 410 does not have separate bodies, as described above, but rather has a body 420 formed as a hollow frame.

The flow aperture 414 is the entire space within the body 420. As such, the mesh material 416 forms the surface of the fire seal 410 except for the frame portions of the body 420. In such an embodiment, the body 420 is configured to provide structural rigidity to the mesh material 416. As shown, the body may be formed as one or more frame portions that are be configured about the mesh material 416. In some embodiments, the body may form a complete frame about an external edge of the mesh material. Further, in some embodiments, as shown in FIG. 4B, cross supports 426 may extend from one frame portion to another frame portion to provide additional structural support to the mesh material.

Advantageously, embodiments disclosed herein may maintain a fire boundary created by a fire seal while permitting air to pass therethrough. The induced flow, i.e., the flow through the fire seal, will cool the local area by permitting stagnant hot air at this location to escape rearward creating flow and reducing the zone temperature. The result is equipment and structure in this area that will operate at a greatly reduced temperature, and thus extend the life of the engine and the components thereof.

Further, advantageously, embodiments disclosed herein are configured to maintain a fire boundary created by the fire seal, but permit the Zone3 air to exit the thrust reverser at the location of the fire seal. The air flow that is enabled by embodiments disclosed herein will cool the local area, e.g., a hot zone, by permitting usually stagnant hot air at this location to escape rearward creating air flow and reducing the zone temperature. The result is equipment and structure in this area that may operate at a greatly reduced temperature. As such, equipment life may be extended.

Moreover, advantageously, the cooler temperatures enabled by embodiments disclosed herein offers a potential to reduce cost and weight of the equipment/engine by the use of less expensive materials and reduced component thicknesses. Further, components residing in this zone may have better life and operate more efficiently, enabling a more reliable product.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

For example, although shown and described with a limited number of configurations, those of skill in the art will appreciate that these examples are provided for illustrative and explanatory purposes, and other configurations are contemplated. For example, as noted, the mesh material may take various configurations, shapes, and/or geometries. In some embodiments, the mesh material may be welded or otherwise affixed to one or more body sections and/or the retainer. Further, although shown with a specific number and shape of flow apertures, those of skill in the art will appreciate that the flow apertures may take any shape, size, and/or number, without departing from the scope of the present disclosure.

Accordingly, the present disclosure is not to be seen as limited by the foregoing description, but is only limited by the scope of the appended claims.

What is claimed is:

1. A fire seal for use with a gas turbine engine, the fire seal comprising:
    a first metallic sheet;
    a second metallic sheet adjacent the first metallic sheet, each sheet having a plurality of segmented fingers, the segmented fingers of the first metallic sheet and the second metallic sheet overlapped such that the space between fingers on one sheet does not overlap the space between the fingers on the other sheet, at least one finger of the first sheet having at least one first flow aperture therein and at least one finger of the second sheet having at least one second flow aperture, the flow aperture of one sheet overlapping the flow aperture of the other sheet such that the flow apertures are aligned to allow fluid flow therethrough and the fingers are misaligned to prevent fluid flow through the space between fingers; and
    a mesh material configured to cover the at least one flow aperture of the two sheets, wherein the mesh material is one of a metallic gauze or a metallic screen that is configured to allow the passage of air therethrough having and a mesh size to prevent fire from passing through the at least one flow aperture.

2. The fire seal of claim 1, wherein when the first sheet is attached to the second sheet the mesh material is retained between the first sheet and the second sheet.

3. The fire seal of claim 1, wherein the at least one flow aperture in each sheet comprises a plurality of flow apertures in each sheet and the mesh material is configured to cover each of the plurality of flow apertures.

4. The fire seal of claim 3, wherein the mesh material comprises a plurality of mesh material segments, wherein each of the plurality of mesh material segments is configured to cover one of the plurality of flow apertures.

5. The fire seal of claim 1, wherein the mesh material has a same shape as the metallic sheets.

6. The fire seal of claim 1, wherein each metallic sheet defines a frame such that the at least one flow aperture is a space defined within the frame and the frames are configured to support the mesh material such that the mesh material covers the entire space defined within the frame.

7. The fire seal of claim 6, further comprising one or more cross supports extending from one portion of the frame to another portion of the frame, wherein the cross supports are configured to provide rigidity to the fire seal.

8. The fire seal of claim 1, further comprising a retainer configured to provide support to at least one of the first metallic sheet, the second metallic sheet, and the mesh material.

9. A fire seal comprising:
    a frame formed of a flexible metal, the frame configured to attach to a thrust reverser and bend in multiple planes to fit on a surface of the thrust reverser, wherein the frame includes a plurality of fingers that are separated and bendable relative to each other such that the frame can bend and fit to the surface; and
    a mesh material supported by the frame, the mesh material being a metallic screen or metallic gauze selected to enable airflow therethrough and prevent passage of a flame,
    wherein the fire seal conforms to the thrust reverser to provide a seal that prevents the passage of flames therethrough when engaging with a surface of a gas turbine engine and allow the passage of air therethrough, the frame including at least one flow aperture wherein air can pass through the mesh material supported by the frame and the mesh material having a mesh size to prevent the passage of fire through the at least one flow aperture.

10. The fire seal of claim 9, wherein the mesh material covers a space within the frame and the frame is configured to support the mesh material such that the mesh material covers the entire space defined within the frame.

11. The fire seal of claim 9, further comprising one or more cross supports extending from one portion of the frame to another portion of the frame, wherein the cross supports are configured to provide rigidity to the mesh material.

12. The fire seal of claim 9, further comprising a retainer configured to provide support to at least one of the frame and the mesh material.

13. A fire seal for use with a gas turbine engine, the fire seal comprising:
a first metallic sheet;
a second metallic sheet adjacent the first metallic sheet, each sheet having a plurality of segmented fingers, the segmented fingers of the first metallic sheet and the second metallic sheet overlapped such that the space between fingers on one sheet does not overlap the space between the fingers on the other sheet, at least one finger of the first sheet having at least one first flow aperture therein and at least one finger of the second sheet having at least one second flow aperture, the flow aperture of one sheet overlapping the flow aperture of the other sheet; and
a metal screen or metal gauze configured to cover the at least one flow aperture of the two sheets to allow the passage of air through the metal screen or metal gauze and prevent fire from passing through the at least one flow aperture,
wherein each segmented finger of the first metallic sheet and the second metallic sheet is bendable in multiple planes independently of the other of the segmented fingers of the same metallic sheet.

14. The fire seal of claim 13, wherein when the first sheet is attached to the second sheet the a metal screen or metal gauze is retained between the first sheet and the second sheet.

15. The fire seal of claim 13, wherein the at least one flow aperture in each sheet comprises a plurality of flow apertures in each sheet and the a metal screen or metal gauze is configured to cover each of the plurality of flow apertures.

16. The fire seal of claim 15, wherein the a metal screen or metal gauze comprises a plurality of segments, wherein each of the plurality of segments is configured to cover one of the plurality of flow apertures.

17. The fire seal of claim 13, wherein the a metal screen or metal gauze has a same shape as the metallic sheets.

18. The fire seal of claim 13, wherein each metallic sheet defines a frame such that the at least one flow aperture is a space defined within the frame and the frames are configured to support the a metal screen or metal gauze such that the a metal screen or metal gauze covers the entire space defined within the frame.

19. The fire seal of claim 18, further comprising one or more cross supports extending from one portion of the frame to another portion of the frame, wherein the cross supports are configured to provide rigidity to the fire seal.

20. The fire seal of claim 13, further comprising a retainer configured to provide support to at least one of the first metallic sheet, the second metallic sheet, and the a metal screen or metal gauze.

* * * * *